(12) United States Patent
Rastinger

(10) Patent No.: US 6,553,815 B1
(45) Date of Patent: Apr. 29, 2003

(54) METHOD AND APPARATUS FOR PERMITTING STABLE OPERATION OF A VEHICLE AT AN EXTREMELY LOW VEHICLE SPEED

(75) Inventor: Bernhard Rastinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 218 days.

(21) Appl. No.: 09/617,753

(22) Filed: Jul. 17, 2000

(30) Foreign Application Priority Data

Jul. 16, 1999 (DE) .......................................... 199 33 321

(51) Int. Cl.[7] ................................................. G01L 3/26
(52) U.S. Cl. ....................................................... 73/116
(58) Field of Search ............................... 73/116, 117.3, 73/118.1, 119 A

(56) References Cited

FOREIGN PATENT DOCUMENTS

| DE | 3421387 | 12/1985 |
|---|---|---|
| DE | 4442025 | 6/1995 |
| DE | 19753764 | 6/1999 |

OTHER PUBLICATIONS

Copy of Search Report.

*Primary Examiner*—Eric S. McCall
*Assistant Examiner*—Maurice Stevens
(74) *Attorney, Agent, or Firm*—Crowell & Moring LLP

(57) ABSTRACT

The method and apparatus according to the invention permits stable driving operation of a motor vehicle at an extremely low vehicle speed by means of an electronic control unit. The internal-combustion engine is automatically adjusted by the control unit to a special rotational speed operation when a defined switch is operated or when a defined set of conditions exists. During special rotational speed operation, the special rotational speed is below the normally permissible idling rotational speed.

25 Claims, 1 Drawing Sheet

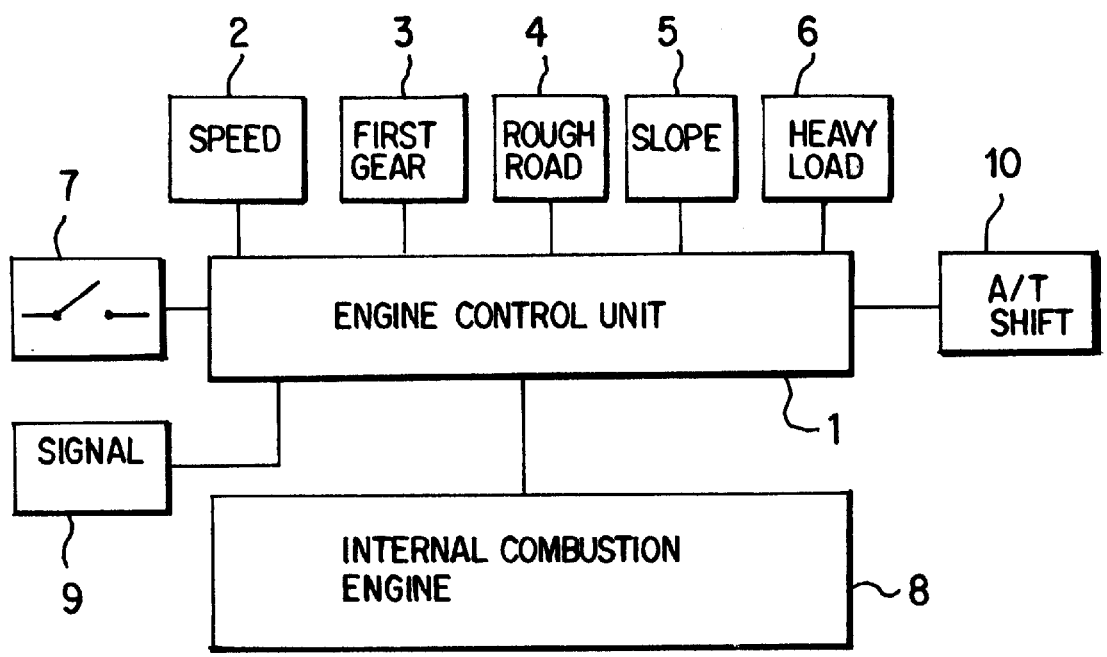

METHOD AND APPARATUS FOR PERMITTING STABLE OPERATION OF A VEHICLE AT AN EXTREMELY LOW VEHICLE SPEED

BACKGROUND AND SUMMARY OF THE INVENTION

This application claims the priority of German patent document 199 33 321.1, filed Jul. 16, 1999, the disclosure of which is expressly incorporated by reference herein.

The invention relates to a method and apparatus for permitting stable operation of a vehicle at an extremely low vehicle speed.

Most all-wheel or cross-country vehicles for use in extreme terrain have an additional transmission position for a so-called "low" operating mode in which it is possible to drive the vehicle at extremely low speeds in difficult terrain. Frequently, this transmission position can be switched on and off only when the vehicle is stopped. The provision of such an additional transmission position requires substantial technical expenditures, space and increases in weight.

It is an object of the invention to provide an improved method and apparatus of the initially mentioned type in which cost and weight are minimized, and the handling is simplified.

This and other objects and advantages are achieved by the method and apparatus according to the invention, in which an engine electronic control unit enables a special engine speed either automatically or in response to the occurrence of a predetermined set of vehicle operating parameters. The special engine speed, which is lower than that which is permitted under normal operating conditions, can be sustained for a limited period of time, without impairment of vehicle operation.

In a first alternative according to the invention, while a designated switch is actuated manually (either a specially provided switch or an existing multifunction switch), the internal-combustion is adjusted to a special rotational speed operation by the electronic control unit using known engine control techniques. During such special rotational speed operation, the electronic control unit permits the engine to operate at a special rotational speed that is below the normally permitted idling rotational speed.

In a second alternative, when a defined condition of the internal-combustion engine exists, the control unit automatically adjusts the internal-combustion engine to a special rotational speed operation, during which the special rotational speed is below the normally defined idling rotational speed. Respective defined conditions for such automatic implementation may be, for example:

Sensors connected with the control unit detect that the vehicle speed is below a defined threshold; and/or sensors connected with the control unit detect that the 1st gear or the reverse gear is used; and/or sensors connected with the control unit detect extreme unevennesses of the road; and sensors connected with the control unit detect extreme longitudinal and/or transverse slopes; and or sensors connected with the control unit detect a trailer operation, a parking operation or an extreme stop-and-go operation, etc.

The special rotational speed operation is preferably set only for a predetermined time period, after which it is automatically switched off. Alternatively, after a predetermined time period, a recommendation or signal (acoustic, optic or haptic) can be emitted to the driver. In the latter case, if the predetermined time period has expired and/or the driver does not follow the recommendation for a relatively long time, the special rotational speed operation can subsequently be switched off automatically.

As a further development of the invention, the special rotational speed operation is switched on and/or off as a function of rotational-speed relevant operating conditions.

Idling rotational speed is normally set so that operating considerations which do not directly affect the internal-combustion engine but are rotational-speed relevant, such as a switched-on air conditioner, battery charging, acoustics, etc. can be maintained optimally. A reduction of the rotational speed of the internal-combustion engine to an extremely low special rotational speed below the idling rotational speed cannot therefore not be set for all operating conditions and/or can be set only for a limited time.

In another advantageous further embodiment of the invention, as an alternative (or in addition), the switched-on special rotational operation is automatically switched off during gear shifting operations, for example, upshifting from the 1st gear or the transition from the reverse gear into the neutral position.

In another advantageous further development of the invention, as an alternative or in addition, the switched-on special rotational speed operation is automatically switched off when a defined vehicle speed is exceeded.

All alternatives can also be combined with one another.

In addition, a switching-off of the special rotational speed operation can also always take place manually by the driver, for example, by operating the switch intended for this purpose.

The switchover to special rotational speed operation, or out of the special rotational speed operation, need not take place only when the vehicle is stopped, as in the known systems, but can also take place during driving.

As a result of the invention, no additional transmission position is required. Rather, an extremely low driving speed for special driving situations (for example, in difficult terrain) is achieved by situation-related activation of a targeted reduction of the rotational speed of the internal-combustion engine via the engine electronic control unit, which exists in all events, for other engine control purposes.

Nowadays, modern electronically controlled internal combustion engines can be operated, for at least a limited time, at extremely low rotational speeds in a stable manner (that is, without a bucking and without a stalling of the internal-combustion engine). Higher idling rotational speeds are often dictated by rotational-speed-dependent values (air conditioner, battery charging condition, acoustics). For a time-limited driving condition, however, these values can be neglected in order to reach extreme vehicle speeds. This operational adaptation can take place without a slipping clutch, thus without any thermal overloading of clutch or transmission parts.

The invention is not limited to cross-country vehicles. It can also be used for improving the driving and the parking maneuvers, for example, during an extreme uphill or downhill drive and/or during a trailer operation and/or during a difficult parking maneuver and/or in the stop-and-go operation.

Other objects, advantages and novel features of the present invention will become apparent from the following detailed description of the invention when considered in conjunction with the accompanying drawings.

BRIEF DESCRIPTION OF THE DRAWINGS

The signal Figure of the drawing depicts an engine control system for implementing extremely low speed operation according to the invention.

DETAILED DESCRIPTION OF THE DRAWINGS

As depicted in FIG. 1, in the engine control arrangement according to the invention, an engine control unit 1 receives inputs from sensors 2–6 for detecting vehicle speed, operation of the vehicle in first gear, extreme road unevenness, extreme transverse or longitudinal slope, and heavy load, such as a trailer being pulled by the vehicle. These input parameters are of course illustrative, and it is apparent that other considerations may be taken into account. In addition, a switch 7 for manually implementing or terminating the special rotational speed operation is also input to the engine control unit 1. In a manual operation of the system, the electronic control unit 1 places the vehicle in the special rotational speed operating mode whenever the switch 7 is actuated, and maintains it for a predetermined period thereafter. As noted previously, during this limited time, the internal combustion engine 8 is permitted to operate at speeds which are below the normal idling rotational speed of the engine. As noted previously, upon expiration of the preset time period, the electronic engine control unit 1 may automatically revert the engine back to its normal operating mode, or may alternatively signal the driver via a signal output unit 9.

In an automatic operating mode, the sensors 2–6 detect the indicated vehicle operating parameters, and upon occurrence of a predetermined set of operating conditions, the engine control unit 1 automatically implements the special rotational speed operation mode. The latter operation mode may be terminated upon the expiration of a predetermined time period, or upon the occurrence of another predetermined set of vehicle operating conditions. In addition, they may also be terminated by actuation of the switch 7 by the vehicle operator. Finally, a detector 10 is also provided for detecting shifting of the vehicle automatic transmission, so that the engine control unit 1 automatically disables the special rotational speed operation when shifting is occurring.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for permitting stable driving operation of a motor vehicle at low vehicle speed comprising:
   detecting manual actuation of a designated switch;
   in response to detected operation of the switch, a vehicle electronic control unit adjusting an internal combustion engine of the vehicle to a special rotational speed operation mode in which said engine is operable at a rotational speed that is below a preset normal idling rotational speed.

2. A method according to claim 1, wherein the special rotational speed operation is set for a defined time period, after which it is switched off again automatically.

3. A method according to claim 1, wherein after a defined time period, a recommendation is emitted to the driver for switching off the special rotational speed operation.

4. A method according to claim 1, wherein the special rotational speed operation is switched on and off as a function of rotational-speed-relevant operating conditions.

5. A method according to claim 1, wherein the switched-on special rotational speed operation is automatically switched off during transmission shifting operations.

6. A method according to claim 1, wherein the switched-on special rotational speed operation is automatically switched off when a defined vehicle speed is exceeded.

7. A method for permitting stable driving operation of a motor vehicle at low vehicle speed, comprising:
   detecting preselected vehicle operating parameters;
   when a defined combination of conditions exists, an engine control unit automatically adjusting an internal-combustion engine of the vehicle to a special rotational speed operation mode in which said engine is operable at a rotational speed that is below a preset normal idling rotational speed.

8. A method according to claim 7, wherein the special rotational speed operation is set for a defined time period, after which it is switched off again automatically.

9. A method according to claim 7, wherein after a defined time period, a recommendation is emitted to the driver for switching off the special rotational speed operation.

10. A method according to claim 7, wherein the special rotational speed operation is switched on and off as a function of rotational-speed-relevant operating conditions.

11. A method according to claim 7, wherein the switched-on special rotational speed operation is automatically switched off during transmission shifting operations.

12. Apparatus for permitting stable driving operation of a motor vehicle at low vehicle speed, comprising:
    an electronic engine control unit; and
    a manually operable switch coupled to the control unit;
    wherein in response to actuation of the switch by a vehicle operator, the engine control unit adjusts the internal-combustion engine to a special rotational speed operation mode in which said engine is operable at a rotational speed that is below a preset normal idling rotational speed.

13. Apparatus according to claim 12, wherein the engine control unit implements the special rotational speed operation only for a predetermined time period, after which it is switched off again automatically.

14. Apparatus according to claim 12, wherein after a defined time period, the engine control unit emits a recommendation to a vehicle driver for switching off the special rotational speed operation.

15. Apparatus according to claim 12, wherein the engine control unit switches the special rotational speed operation on and off as a function of rotational-speed-relevant operating conditions.

16. Apparatus according to claim 12, wherein the engine control unit automatically switches the special rotational speed operation off during transmission shifting operations.

17. Apparatus according to claim 12, wherein the engine control unit automatically switches the special rotational speed operation off when a defined vehicle speed is exceeded.

18. Apparatus for permitting stable driving operation of a motor vehicle at an extremely low vehicle speed, comprising:
    an electronic engine control unit; and
    sensors for detecting preselected vehicle operating parameters;
    wherein, when predetermined vehicle operating conditions are detected by said sensors, the engine control unit adjusts the internal-combustion engine to a special rotational speed operation in which said engine is operable at a rotational speed that is below a preset normal idling rotational speed.

19. Apparatus according to claim 18, wherein the engine control unit implements the special rotational speed operation only for a predetermined time period, after which it is switched off again automatically.

20. Apparatus according to claim 18, wherein after a defined time period, the engine control unit emits a recommendation to a vehicle driver for switching off the special rotational speed operation.

21. Apparatus according to claim 18, wherein the engine control unit switches the special rotational speed operation on and off as a function of rotational-speed-relevant operating conditions.

22. Apparatus according to claim 18, wherein the engine control unit automatically switches the special rotational speed operation off during transmission shifting operations.

23. Apparatus according to claim 18, wherein the engine control unit automatically switches the special rotational speed operation off when a defined vehicle speed is exceeded.

24. A method for controlling operation of a motor vehicle having an internal combustion engine with a preset idling rotational speed, said method comprising:

detecting manual actuation of a designated switch;

in response to detected operation of the switch, a vehicle electronic control unit adjusting the internal combustion engine to a special rotational speed operation mode in which said engine is operable at a rotational speed that is below the preset normal idling rotational speed.

25. A method for controlling operation of a motor vehicle having an internal combustion engine with a preset idling rotational speed, said method comprising:

detecting preselected vehicle operating parameters;

when a defined combination of conditions exists, an engine control unit automatically adjusting the internal-combustion engine to a special rotational speed operation mode in which said engine is operable at a rotational speed that is below a preset normal idling rotational speed.

* * * * *